May 16, 1967  P. DE WAARD  3,320,548
MEASURING BRIDGE OSCILLATOR WITH IMPROVED LINEARITY
Filed Oct. 22, 1965

INVENTOR.
Pieter de Waard
BY
Watson, Cole, Grindle + Watson
Attorneys

United States Patent Office 3,320,548
Patented May 16, 1967

3,320,548
MEASURING BRIDGE OSCILLATOR WITH IMPROVED LINEARITY
Pieter de Waard, Monster, Netherlands, assignor to Nederlandse Organisatie voor Toegepast-Natuurwetenschappelijk Onderzoek ten behoeve van Nijverheid, Handel en Verkeer, The Hague, Netherlands
Filed Oct. 22, 1965, Ser. No. 501,839
Claims priority, application Netherlands, Nov. 2, 1964, 6,412,745
1 Claim. (Cl. 331—65)

ABSTRACT OF THE DISCLOSURE

This disclosure relates to a measuring circuit controlling a bridge oscillator having a feedback loop with two series connected phase shifting networks therein. The oscillator frequency is varied by bridge unbalance. The linearity of frequency variation with bridge unbalance is improved by changing the conventional 90° phase shifting networks to one of 60° and another of 120°.

---

The present invention relates to a measuring circuit, provided with a feedback oscillator, the frequency of which can be varied by a magnitude to be measured, comprising an amplifier and a feedback chain, consisting of two cascade coupled R-C chains that shift 180° in phase together and provided with a bridge network connected across an R-C phase shifting network and comprising a mesauring bridge, which is fed from the feedback chain and in which the magnitude to be measured affects the bridge network balance.

Such a measuring circuit is known.

A definite unbalance of a bridge as a result of a magnitude which has been measured, causes this known bridge oscillator circuit to emit a very definite frequency which deviates from the centre frequency, that is the frequency excited by the circuit at bridge balance.

It is desirable that the connection between unbalance of the bridge and the frequency deviation of the oscillator should be linear over as large as possible a region.

Now in the prior art bridge oscillator the said region is very narrow.

The surprising result of the invention which is described hereinafter, is that this linear connection may be improved with very simple means.

Up till today it was considered that the two phase-shifting chains, which were being applied in the bridge oscillator, would have to be chains, which, at centre frequency, should each give a phase-shift of substantially 90° of the signal to be fed back.

It has been found that, if the bridged-over R-C chain gives a phase shift of approximately 60° at bridge balance, the aforesaid surprising result of a much larger linear region becomes available.

The present invention will hereinafter be elucidated with reference to the accompanying drawing, comprising 3 figures.

In this drawing.

In these figures, like elements are indicated by like numerals and symbols.

Figure 1:
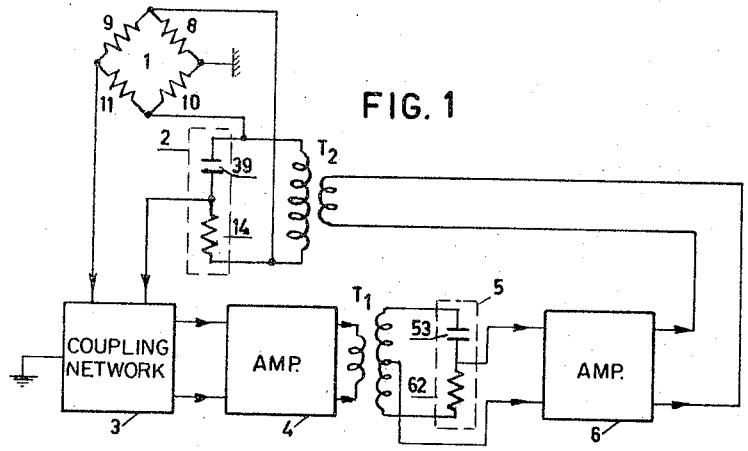
FIG. 1 represents a bridge oscillator, a measuring curve A of which is represented in FIGURE 2 whilst applying 90° phase shifters in the bridge oscillator, and a measuring curve B of which has been drawn whilst applying the present invention, a 60° phase shifter parallel to the bridge and a second 120° phase shifter in the feedback circuit.

In FIGURE 1, the input of a coupling network 3 is connected with the outputs of the bridge 1 and the phase shifter 2.

The output of the network 3 is connected to the input of an amplifier 4, which amplifies the signal appearing on its input X times.

The transformer $T_1$ offers this amplified signal via a phase shifter 5 to the input of a separation amplifier 6.

The separation amplifier 6 emits a signal to the transformer $T_2$, which signal with regard to the signal at its input has been shifted in phase over 180° and which is further used as feeder voltage for the bridge 1 and the phase shifter 2.

The bridge oscillator oscillates, when the phase of the closed amplification loop is 360° or 0°.

Now the circuit has been so constructed that such the case for the centre frequency $\omega_0$ at bridge balance.

For a definite bridge unbalance, the circuit will oscillate in a different definite frequency.

Now the connection between unbalance and frequency deviation should show the best possible linearly.

When 90° phase shifters have been applied, as in usual, at the places 2 and 5 indicated by dotted lines in the circuit of FIGURE 1, then a reasonable linear connection may only be expected between bridge unbalance and frequency deviation in the vicinity of the centre frequency.

Figure 2:
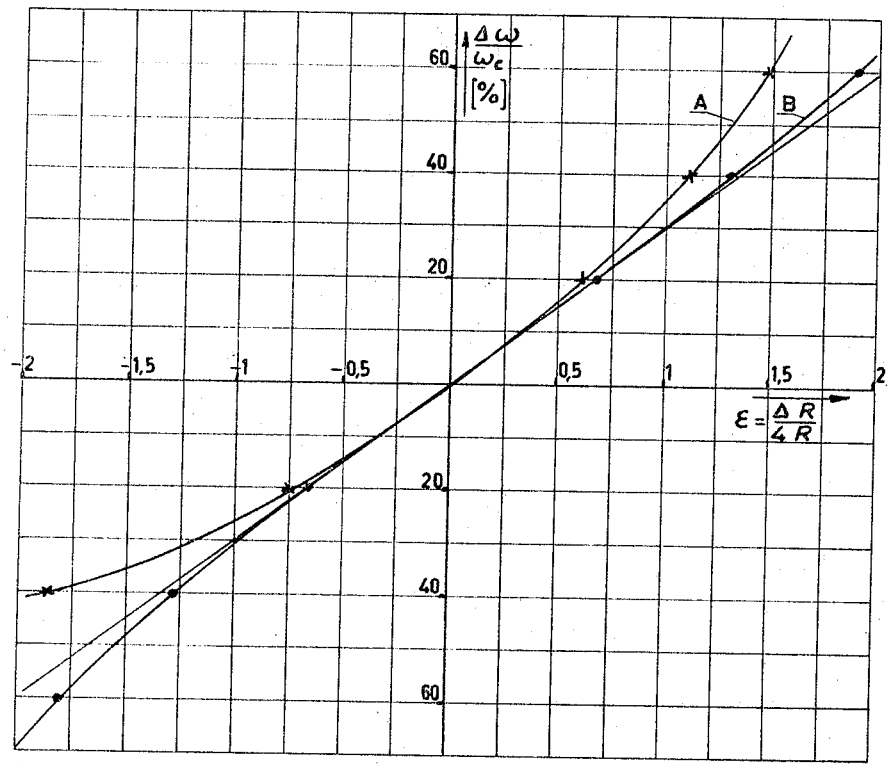

The above is shown by the line A in FIGURE 2.

When, according to the invention, a 60° phase shifter has been applied at the place 2 and a 120° phase shifter at the place 5, this will result in a much wider linear region.

This is shown by the line B in FIGURE 2.

Figure 3:
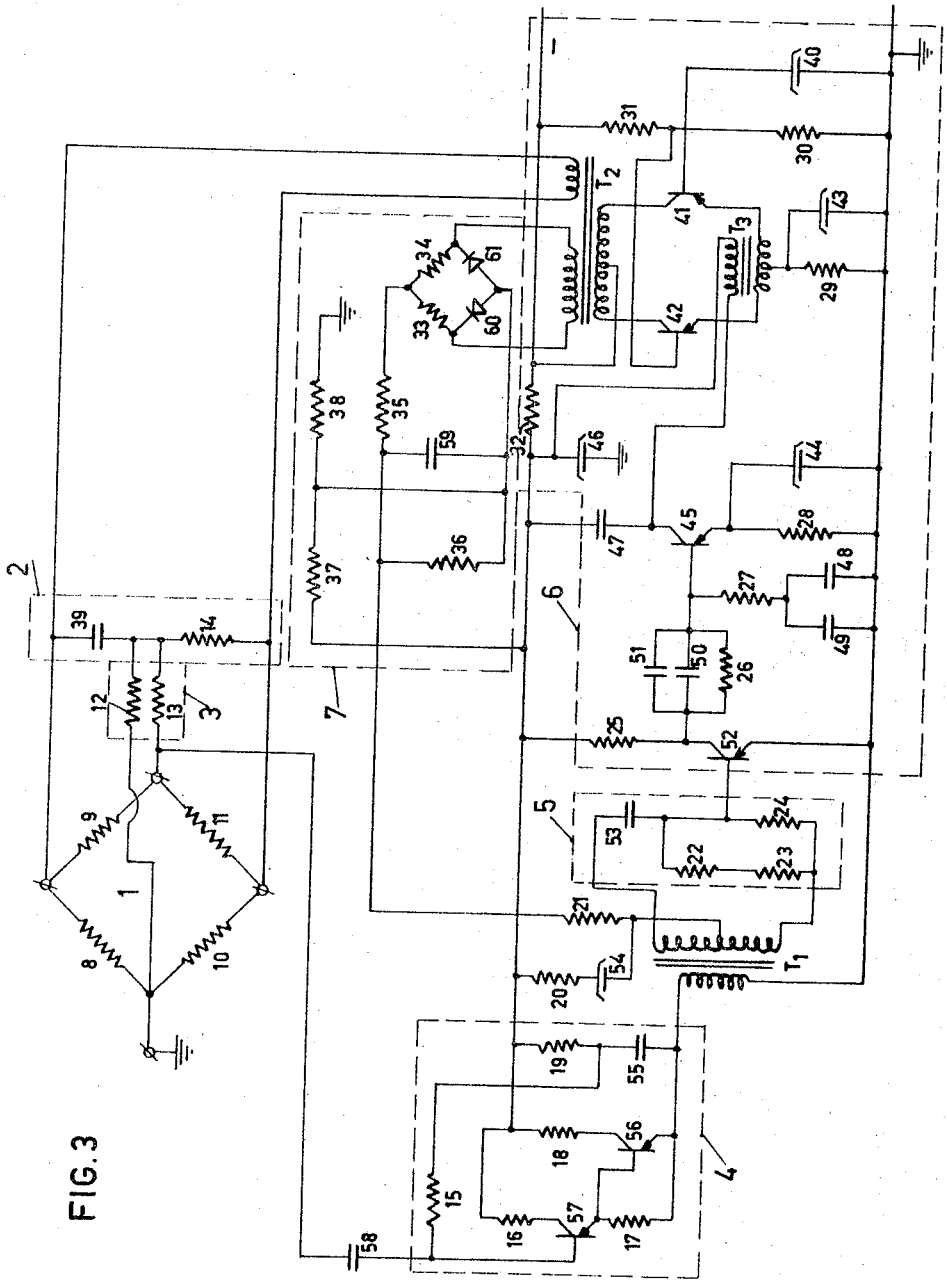
FIG. 3 shows the diagram of a bridge oscillator, with which the curves of FIG. 2 were taken down.

In the embodiment of the invention shown in FIGURE 3, all the elements from 2 to 6 inclusive of FIGURE 1 can be found again as blocks surrounded by dotted lines.

As all of these blocks are conventional, they need no further explanation.

A conventional amplitude limiting circuit 7 has been incorporated in this embodiment of the invention as an extra.

A table of the values of the parts of the oscillator according to FIGURE 3 is subjoined:

F.M. oscillator—5 kilocycles
Frequency deviation—±750 cycles for 0.15% bridge unbalance $\Delta R/R$
Bridge voltage—2×2$_{\text{eff.}}$ against earth.

Resistances:
    8, 9, 10, 11—150 ohms
    12, 13—12K ohms
    14, 31—1K ohms
    15—150K ohms
    16—470 ohms
    17, 27—3K3 ohms
    18—120 ohms
    19—150K ohms
    20—270 ohms
    21—47K ohms
    22, 24, 25—2K2 ohms
    23—820 ohms
    36—10K ohms
    28—560 ohms
    29, 32—10 ohms
    30—330 ohms
    33, 34—22K ohms
    35—33K ohms
    37, 38—4K7 ohms Condensers:
    39 for drawing curve A—35K $\mu\mu$f.
    39 for drawing curve B—24K $\mu\mu$f.
    47, 58, 55—33K $\mu\mu$f.
    43, 54—10 $\mu$f.

Condensers:
    51, 50, 48—3K3 μμf.
    49—6K8 μμf.
    40, 44—2.5 μf.
    46—100 μf.
    59—5K6 μμf.
    53 for drawing curve A—33K μμf.
    53 for drawing curve B—48K μμf.
60, 61—OA5 Philips diode
57—OC466 Intermetall transistor
56, 52, 45—OC468 Intermetall transistor
42, 41—OC72 Philips transistor

I claim:

A measuring circuit including a feedback oscillator comprising a measuring bridge which changes oscillator frequency in response to a magnitude being measured which serves to unbalance the bridge, said oscillator having in its feedback network a first R–C phase shift network that changes the phase 120° and a second R–C phase shift network coupled in cascade therewith to change the phase approximately 60° at bridge balance, said measuring bridge being connected across the second said phase shift network to effectively change the oscillator frequently with changes in bridge balance.

References Cited by the Examiner

UNITED STATES PATENTS 2,451,858  10/1948  Mork _____ 331—137 X
2,923,893   2/1960  Runyan _____ 331—140 X ROY LAKE, *Primary Examiner.*

S. H. GRIMM, *Assistant Examiner.*